United States Patent [19]

Cramer, Jr. et al.

[11] Patent Number: 4,790,683
[45] Date of Patent: Dec. 13, 1988

[54] TOLERANCE RING AND SHIM AND METHOD OF USE

[76] Inventors: Arthur A. Cramer, Jr., 11 N. Grant St., Hinsdale, Ill. 60521; Brian S. Cramer, R.R. 2, Box 174, Manhattan, Ill. 60442

[21] Appl. No.: 104,251

[22] Filed: Oct. 5, 1987

[51] Int. Cl.$^4$ .............................................. B25G 3/34
[52] U.S. Cl. ................................... 403/372; 403/365; 403/369; 403/371
[58] Field of Search ............... 403/365, 369, 371, 372, 403/362

[56] References Cited

U.S. PATENT DOCUMENTS

| | | |
|---|---|---|
| 1,662,544 | 3/1928 | Solenberger . |
| 2,897,026 | 7/1959 | Haller et al. . |
| 2,931,412 | 4/1960 | Wing . |
| 3,061,386 | 10/1962 | Dix et al. . |
| 3,125,397 | 3/1964 | McGrath ......................... 403/362 X |
| 3,142,887 | 8/1964 | Hulck et al. . |
| 3,145,547 | 8/1964 | Lyons . |
| 3,197,243 | 7/1965 | Brenneke . |
| 3,494,676 | 2/1970 | Compton ......................... 403/372 X |
| 3,700,271 | 10/1972 | Blaurock et al. . |
| 3,730,569 | 5/1973 | Feinler ................................ 403/362 |
| 3,838,928 | 10/1974 | Blaurock et al. . |
| 4,286,894 | 9/1981 | Rongley . |
| 4,376,254 | 3/1983 | Hellman . |
| 4,636,106 | 1/1987 | Waisbrod ............................ 403/372 |

FOREIGN PATENT DOCUMENTS

| | | |
|---|---|---|
| 238798 | 4/1910 | Fed. Rep. of Germany . |
| 1337146 | 7/1963 | France . |
| 1372974 | 11/1974 | United Kingdom . |

OTHER PUBLICATIONS

Advertisement from "Electrical Apparatus Electro Mechanical Bench Reference"—1985, p. 53.

Primary Examiner—James T. McCall
Attorney, Agent, or Firm—Hill, Van Santen, Steadman & Simpson

[57] ABSTRACT

A method of using a tolerance ring in conjunction with a relatively soft material while preventing deformation of the soft material is provided through the use of a split cylinder shim between the tolerance ring and the soft material. This arrangement can be used whether the soft material is surrounded by the tolerance ring, surrounds the tolerance ring or both.

7 Claims, 1 Drawing Sheet

TOLERANCE RING AND SHIM AND METHOD OF USE

BACKGROUND OF THE INVENTION

1. Field of the Invention

The present invention relates to tolerance rings and more particularly to improvements in the use of tolerance rings to provide their use for mounting in relatively soft materials.

2. Description of the Prior Art

Tolerance rings are generally formed as split ring members having a corrugated or wavy surface and are sandwiched between two cylindrical surfaces, that is, an outer cylindrical surface and an inner cylindrical surface, to provide frictional engagement between two members having the respective cylindrical surfaces. The corrugations or waves on the ring may protrude inwardly from an outer surface thereof, outwardly from an inner surface thereof or alternatively inwardly and outwardly. Such tolerance rings are illustrated in U.S. Pat. Nos. 3,142,887 and 3,145,547. The corrugations on the tolerance rings may be of varying heights or may be arranged in more than one row around the circumference of the ring as illustrated in U.S. Pat. Nos. 3,700,271; 3,838,928 and 4,286,894.

In some applications it is desirable to mount a cylindrical member within a hole in a relatively soft material such as plastic or metal powder parts. Tolerance rings may be used to provide an increased frictional engagement between the cylindrical member and the hole in the soft material due to a compression of the corrugations of the ring, however, if there is a significant amount of vibration or radial load present, the tolerance ring may tend to deform the soft material or to set in the material such that the corrugations will no longer be compressed, thereby resulting in a loss of frictional engagement between the cylindrical member and the hole.

In other applications the tolerance ring may surround a cylindrical object formed of a relatively soft material and that assembly inserted into a hole whereby compression of the corrugations on the ring will provide a desired frictional engagement between the cylindrical object and the hole. Again if the two objects, the cylindrical member and the object in which the hole is located, are subject to vibration or radial loads, the tolerance ring may set into the soft cylindrical object thereby resulting in a loss of frictional engagement. Thus, it would be desirable to have a means for preventing such setting or deformation of the relatively soft material by the tolerance ring. Also, the force of the corrugations under their normal compression will sometimes deform the adjoining surface if it is a soft material, without requiring additional forces such as vibration or radial loading.

SUMMARY OF THE INVENTION

The present invention provides means for overcoming each of the problems described above. Specifically, a standard tolerance ring is to be used in conjunction with a shim which is in the form of a split cylindrical ring, generally having an axial height at least as great as the axial length of the corrugations. When the tolerance ring is pressed into an opening in a relatively soft material, the shim is to surround the ring and will thereby spread the focussed load of the corrugations evenly around the entire circumference of the hole to prevent deformation of the opening in the soft material. Similarly, when the tolerance ring is to surround a soft material, the cylindrical shim will be placed on the interior of the tolerance ring to spread the force of the corrugations evenly over the circumference of the soft cylindrical object. Therefore, deformation of the soft material will be prevented and the desired frictional engagement will be maintained.

DESCRIPTION OF THE PREFERRED EMBODIMENTS

Figure 1:
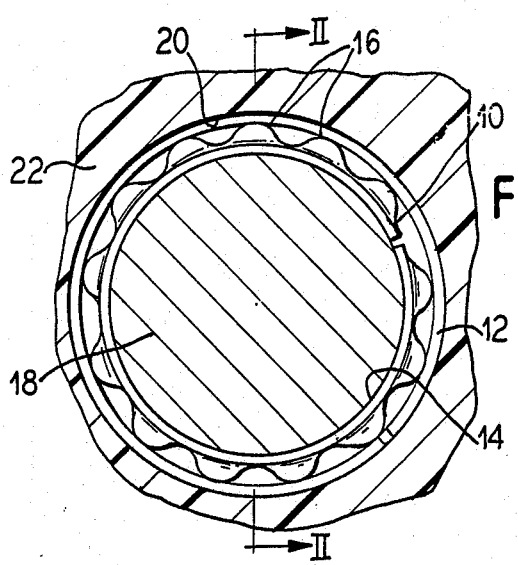
FIG. 1 is a plan view of a tolerance ring and shim embodying the principles of the present invention when the ring is to be placed in a hole in a relatively soft material.

FIGS. 1-6 illustrate a tolerance ring 10 and a cylindrical shim 12 embodying the principles of the present invention. The tolerance ring has a cylindrical inner surface 14 and a plurality of radially outwardly projecting corrugations 16. Tolerance rings generally are formed from spring steel and, when sandwiched between an inner cylindrical member 18 and a cylindrical opening or hole 20 in an outer member 22 assure a snug fit between the inner member 18 and the outer member 22 and, in varying degrees, provides a means for the transfer of torque and axial resistance between the two members. A radial force is transfered from the tolerance ring to the surface of the opening due to compression of the corrugations, this force being focussed or concentrated in axial lines corresponding to the outward and inward peaks of the corrugations. When the outer member is fabricated of a soft material relative to the spring steel of the tolerance ring, such as plastic, metal powder parts or metals softer than spring steel, the hole in the outer member may be deformed causing the ring to set into the material thereby reducing the radial force between the members to a point which may result in undesired slippage between the two members.

To prevent such setting, the shim 12 is placed around the exterior of the ring to spread the radial force of the tolerance ring over the entire circumferential surface of the opening. The shim 12 has an axial length L at least as long as an axial length l of the corrugations and preferably as long as an axial length l' of the entire tolerance ring. The shim is to be fabricated of a spring carbon or stainless steel similar to or the same as that used for the tolerance ring so that it will be able to absorb and redistribute the localized radial forces of the tolerance ring.

Figure 2:
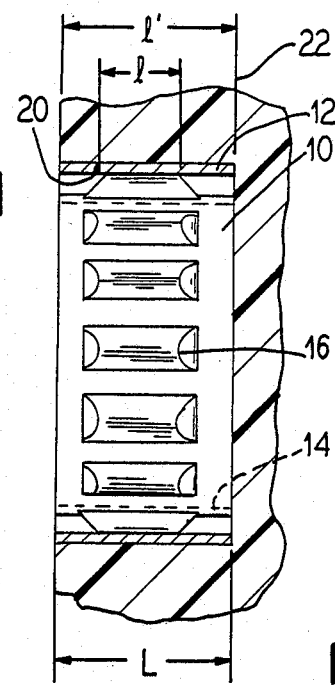
FIG. 2 is a sectional view of the tolerance ring and shim taken generally along the lines II—II of FIG. 1.
Figure 3:
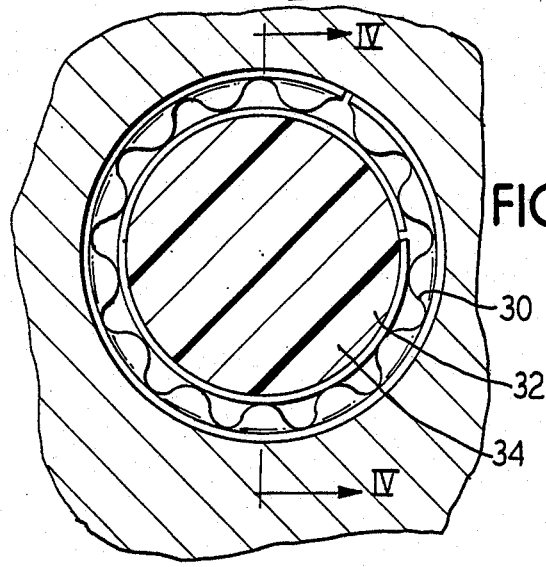
FIG. 3 is a plan view of a tolerance ring and shim embodying the principles of the present invention when the ring is to be placed around a cylindrical object of a relatively soft material.
Figure 4:
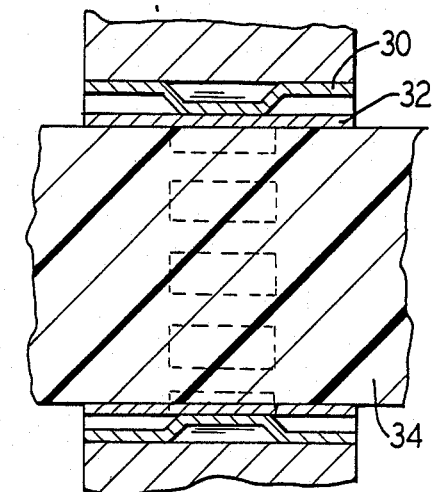
FIG. 4 is a sectional view of the tolerance ring and shim taken generally along the line IV—IV of FIG. 3.

FIGS. 3 and 4 show a tolerance ring 30 and shim 32 which are merely in a reversed position from those shown in FIGS. 1 and 2, in that a surrounded cylindrical member 34 is formed of a relatively soft material as compared to the tolerance ring. The shim is therefore placed between the tolerance ring and the interior cylindrical member 34. Again the radial force from the ring will be spread by the shim evenly over the entire outer cylindrical surface of the inner cylindrical member.

Figure 5:
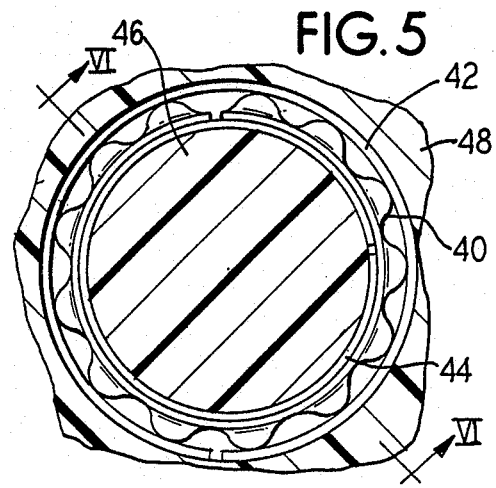
FIG. 5 is a plan view of a tolerance ring and two shims embodying the principles of the present invention where the ring is to be placed around a cylindrical object of a relatively soft material and within a hole in a relatively soft material.
Figure 6:
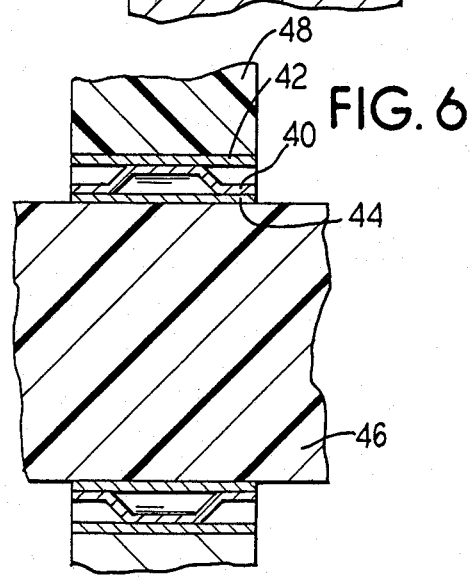
FIG. 6 is a side sectional view of the tolerance ring and shims taken generally along the line VI—VI of FIG. 5.

FIGS. 5 and 6 show a tolerance ring 40, an outer shim 42 and an inner shim 44 all in concentric engagement which surround a cylindrical member 46 which is formed of a relatively soft material as compared to the tolerance ring. An outer member 48 is also formed of a relatively soft material and therefore the shims are used both on the inside and outside circumference of the tolerance ring to spread the radially inwardly directed forces as well as the radially outwardly directed forces to prevent deformation of either the inner member 46 or outer member 48.

Thus, it is seen that our present invention provides for improvements in the use of tolerance rings and shims permitting them to be utilized in holding cylindrical members within cylindrical openings in relatively soft materials or holding cylindrical members formed of relatively soft materials in an outer member while preventing the tolerance ring from a setting in the relatively soft material, thereby ensuring continued frictional engagement, torque transfer and axial retention between the inner and outer members.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. A tolerance ring and shim assembly for use in conjunction with a cylindrical surface of a relatively soft material, said tolerance ring being in the form of a split cylinder defining a longitudinal axis and having a plurality of laterally spaced, axially extending corrugations projecting radially from said cylinder, which is to be sandwiched between an inner cylindrical surface of an outer member and an outer cylindrical surface of an inner member, one of said members being formed of a relatively soft material compared to said tolerance ring and said shim being in the form of a split cylinder with a smooth surface, comprising:

said shim having a diameter sized to engage against said soft material cylindrical surface, and said tolerance ring having a diameter sized to engage against said shim on an opposite side of said shim from said soft material cylindrical surface, whereby, said shim will prevent said corrugations from deforming said soft material cylindrical surface.

2. A tolerance ring and shim assembly according to claim 1, wherein a single shim is utilized which overlies an outer surface of said tolerance ring, said outer member being fabricated of a relatively soft material.

3. A tolerance ring and shim assembly according to claim 1, wherein a single shim is utilized which lies within said tolerance ring, said inner member being fabricated of a relatively soft material.

4. A tolerance ring and shim assembly according to claim 1, wherein two shims are utilized one of which overlies an outer surface of said tolerance ring and one of which lies within said tolerance ring, said outer and inner members being fabricated of a relatively soft material.

5. A tolerance ring and shim assembly according to claim 1, wherein said shim has an axial length at least as great as an axial extent of said corrugations.

6. A tolerance ring and shim assembly according to claim 5, wherein said shim has an axial length at least as great as an axial length of said ring.

7. A method of preventing deformation of a cylindrical surface in a relatively soft material by a tolerance ring in the form of a split cylinder defining a longitudinal axis and having a plurality of laterally spaced, axially extending corrugations projecting radially from said cylinder, said tolerance ring being sandwiched between an inner cylindrical surface of an outer member and an outer cylindrical surface of an inner member at least one of said members being formed of a relatively soft material in comparison to said tolerance ring, comprising the step of inserting a shim in the form of a split cylinder having smooth cylindrical inner and outer surfaces between said tolerance ring and said relatively soft material.

* * * * *